(12) United States Patent
Murai

(10) Patent No.: US 6,411,421 B1
(45) Date of Patent: Jun. 25, 2002

(54) OPTICAL SHORT PULSE GENERATOR

(75) Inventor: Hitoshi Murai, Tokyo (JP)

(73) Assignee: Oki Electric Industry Co, Ltd., Tokyo (JP)

(*) Notice: Subject to any disclaimer, the term of this patent is extended or adjusted under 35 U.S.C. 154(b) by 55 days.

(21) Appl. No.: 09/639,945

(22) Filed: Aug. 17, 2000

(30) Foreign Application Priority Data

Aug. 23, 1999 (JP) .......................................... 11-235193

(51) Int. Cl.$^7$ .............................. G02F 1/03; G02F 1/07; G02F 1/01; H01S 3/00; H01S 3/30
(52) U.S. Cl. ........................ 359/248; 385/1; 359/341.1; 372/6
(58) Field of Search ................................ 359/245–248, 359/250, 163, 158, 264, 180–188; 385/1–10, 24, 27–28, 31–32, 14, 129, 37–39, 131–132; 372/10, 12–13, 26–27, 38; 383/131–132

(56) References Cited

U.S. PATENT DOCUMENTS 5,798,856 A * 8/1998 Suzuki et al. ................ 359/181
5,889,607 A * 3/1999 Suzuki et al. ................ 359/245
6,289,142 B1 * 9/2001 Yamada .......................... 385/1

OTHER PUBLICATIONS

"40 Gbit/s OTDM Signals Transmission Experiment", The IEICE Communication Society Convention Papers 2, B–10–117; p. 416; 1997.

* cited by examiner

Primary Examiner—Georgia Epps
Assistant Examiner—William Choi
(74) Attorney, Agent, or Firm—Rabin & Berdo, P.C.

(57) ABSTRACT

The present invention relates to an optical short pulse generator using an EA modulator. In addition to continuous wave light for generating an optical short pulse train, pump light for generating a pile up is injected into this EA modulator. Generating a pile up increases the number of photo-carriers which accumulate in the light absorption layer without being swept out to the clad layer, and this increases the change in the light absorption quantity when a sinusoidal electric field is applied to the EA modulator. The EA modulator in accordance with the present invention has excellent extinction characteristics so that it can generate an optical short pulse train whose loss is small and pulse width is very small. According to one preferred embodiment of the present invention, the pump light is injected into the light absorption layer of the EA modulator, not from the end face where continuous wave light is injected, but from the end face where the optical short pulse train is emitted.

20 Claims, 4 Drawing Sheets

OPTICAL SHORT PULSE GENERATOR

BACKGROUND OF THE INVENTION

1. Field of the Invention

The present invention relates to an optical short pulse generator using an electro-absorption semiconductor optical modulator. The present invention is applied, for example, to a light source of optical fiber communication.

2. Description of Related Art

Technology to generate optical short pulses using an electro-absorption semiconductor optical modulator (EA modulator) has been known.

An EA modulator is an element to modulate the intensity of light using the Franz-Keldysh effect. The Franz-Keldysh effect is an effect of changing the wavelength absorption edge when voltage is applied to a high resistance semiconductor. In an EA modulator, a light absorption quantity increases when reverse voltage is applied. So by applying sinusoidal voltage to an EA modulator, an optical short pulse train can be generated using continuous wave laser beams.

When optical short pulses are generated by an EA modulator, the extinction characteristics is an important element. The extinction characteristics of the EA modulator is determined by the absorption quantity when a forward voltage is applied and by the absorption quantity when a backward voltage is applied. By improving the extinction characteristics, the loss of the optical short pulse train can be decreased and the minimum value of the pulse width, which the EA modulator can generate, can be decreased.

The magnitude of change of the absorption coefficient depends on the inherent characteristics of the semiconductor, the applied electric field, the detuning quantity and other factors. Detuning quantity is the difference between the band gap wavelength of the light absorption layer and the wavelength of light. The light absorption quantity of an EA modulator changes according to the quantity of light confined to a light wave guide in the EA modulator. Therefore, the extinction characteristics of an EA modulator is roughly determined by the device structure and the characteristics of the material of the light absorption layer.

Currently in the optical communication field, it is demanded to use 10 giga-hertz or higher optical short pulses as a light source. In order to generate 10 giga-hertz or higher optical short pulses using an EA modulator, the capacitance of the element must be very small, so the length of the EA modulator must be 200–300 $\mu$m or less. Restricting the size of the EA modulator requires restrictions on the structure of the EA modulator. Therefore, it is very difficult to improve the extinction characteristics by improving the structure of an EA modulator.

In addition, it is not easy to improve the extinction characteristics by changing the material of the light absorption layer either, since control becomes complicated.

A known technology to decrease the pulse width of optical short pulses is the technology proposed by Kanaoka and others. This technology was explained in "40 Gbit/s OTDM signals transmission experiment", 1997, The IEICE Communication Society Convention Papers 2, B-10-117, p. 416.

Kanaoka and others decrease the pulse width by compressing the optical short pulse train generated by an EA modulator using dispersion decreasing fiber (DDF). Dispersion decreasing fiber however is expensive. Another shortcoming of dispersion decreasing fiber is that it not flexible during use, which means that the light intensity must be changed according to the wavelength of the optical pulses to be compressed since the dispersion of light is fixed.

SUMMARY OF THE INVENTION

It is an object of the present invention to provide an optical short pulse generator having excellent extinction characteristics, that is, an optical short pulse generator which has low loss and can generate an optical short pulse train with a very short pulse width.

To achieve this object, an optical short pulse generator in accordance with the present invention comprises means for generating optical short pulses from incident light injected into a light absorption layer according to the frequency of the control voltage, means for supplying the incident light to the light absorption layer of the generation means, means for applying the control voltage to the generation means, and means for supplying pump light to the light absorption layer of the generation means in order to generate a pile up.

Generating a pile up by irradiating pump light to the light absorption layer of the generation means can improve the extinction characteristics.

BRIEF DESCRIPTION OF THE DRAWINGS

Other objects and advantages of the present invention will be described with reference to the accompanying drawings.

DESCRIPTION OF THE PREFERRED EMBODIMENTS

Figure 1:
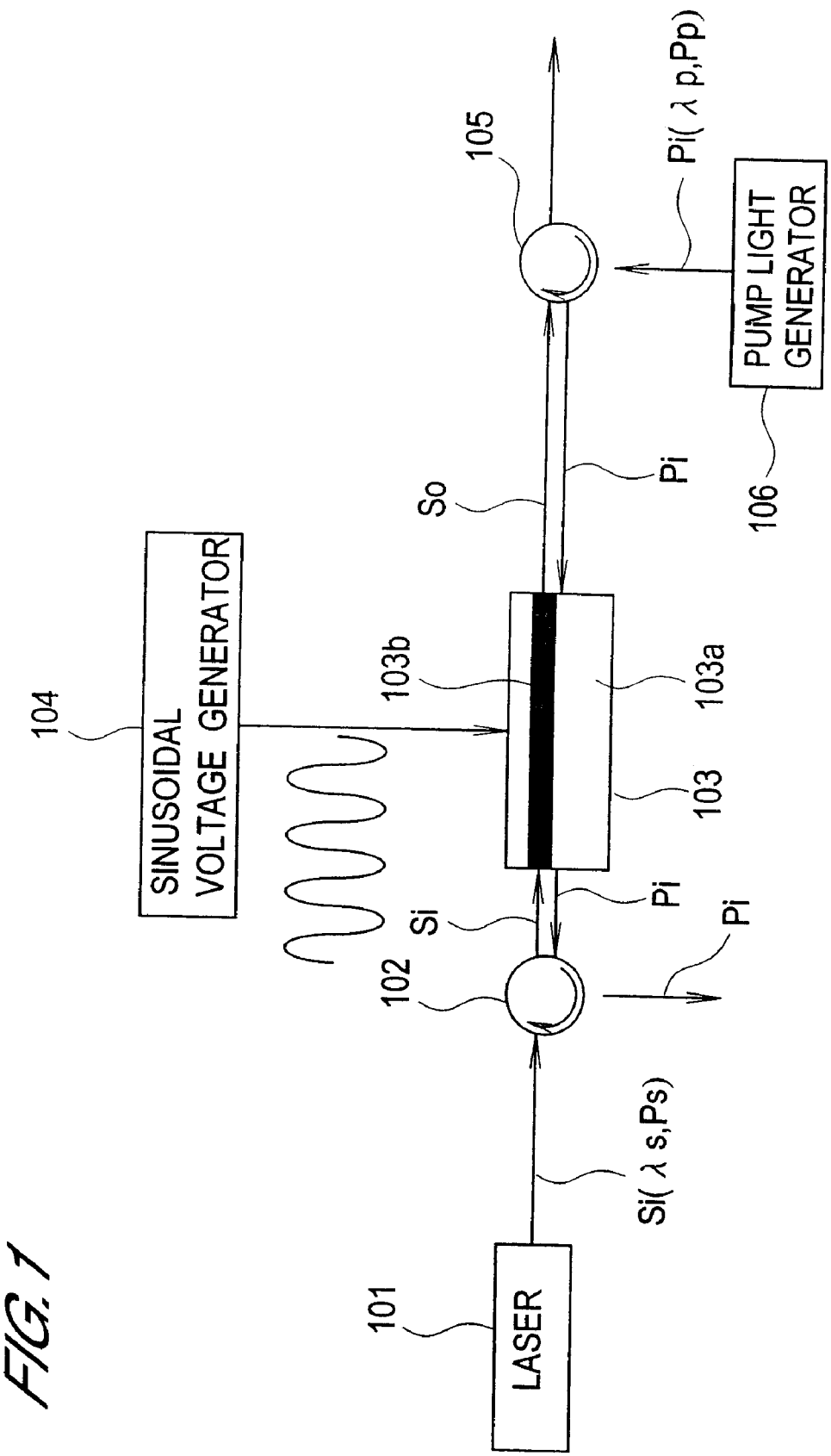
FIG. 1 is a conceptual diagram depicting a configuration of an optical short pulse generator in accordance with a first embodiment.

Embodiments of the present invention will now be described with reference to the drawings. In the drawings, size, shape and the positional relationship of each component are shown merely to help understand the present invention, and the numerical conditions to be described below are merely examples.

First Embodiment

The first embodiment of the present invention will be described with reference to FIGS. 1–3.

As FIG. 1 shows, the optical short pulse generator in accordance with the present embodiment comprises a laser 101, a light circulator 102, an EA modulator 103, a sinusoidal voltage generator 104, a light circulator 105 and a pump light generator 106.

The laser 101 outputs continuous wave light Si. In the following description, it is assumed that $\lambda s$ is the wavelength of the light Si and Ps is the intensity of the light Si.

The optical circulator 102 injects the continuous wave light Si, which is output from the laser 101, into the EA modulator 103. Also, the light circulator 102 refracts the pump light Pi, which is emitted from the EA modulator 103, so as not to reach the laser 101.

The EA modulator 103 has an InGaAsP light absorption layer 103b formed on an InP substrate 103a. The EA modulator 103 generates an optical short pulse train So using the continuous wave light Si, which is injected from the light circulator 102. The continuous wave light Si is injected from one face of the EA modulator 103, and the optical short pulse train So is emitted from the other face of the EA modulator 103. Sinusoidal voltage generated by the sinusoidal voltage generator 104 is applied to the EA modulator 103. The pulse width of the optical short pulse train So is determined depending on the frequency of this sinusoidal voltage. In addition, the EA modulator 103 injects the pump light Pi from the face where the optical short pulse train So is emitted. A part of the pump light Pi, injected into the EA modulator 103, is absorbed by the light absorption layer 103b of the EA modulator 103, and the rest is emitted from the face where the continuous wave light Si is injected. As mentioned later, the light Pi absorbed by the light absorption layer 103b contributes to the generation of a pile up. And as mentioned above, the pump light Pi, emitted from the EA modulator 103, reaches the light circulator 102.

The sinusoidal voltage generator 104 generates sinusoidal voltage with a predetermined frequency, as mentioned above, and applies this voltage to the EA modulator 103.

The light circulator 105 emits the optical short pulse train So, which is emitted from the EA modulator 103, to outside the optical short pulse generator, and guides the pump light Pi, which is generated by the pump light generator 106, to the EA modulator 103.

The pump light generator 106 generates and emits the pump light Pi. Because of the later mentioned reason, the wavelength of the pump light Pi is preferably a wavelength which is close to the band gap wavelength of the EA modulator 103, and is longer than this band gap wavelength. In the following description, it is assumed that $\lambda p$ is the wavelength of the pump light Pi, and Pp is the intensity of the pump light Pi.

The optical short pulse generator in accordance with the present invention implements excellent extinction characteristics by generating a pile up of the light absorption layer 103b using the pump light Pi. The principle of the optical short pulse generator in accordance with the present invention will now be described.

The EA modulator 103 comprises a light absorption layer 103b and two clad layers, which sandwich the light absorption layer 103b. The continuous wave light Si is injected into the light absorption layer 103b. To modulate intensity, the EA modulator 103 applies reverse bias to the light absorption layer 103b, that is, increases the light absorption coefficient of the light absorption layer 103b. If the band gap wavelength of the semiconductor crystal constituting the light absorption layer 103b is set to a wavelength near or the same as the wavelength of the light Si to be modulated, then the absorption efficiency of the light absorption layer 103b increases. Band gap wavelength is a value when the energy equivalent to the band gap of the semiconductor is converted to wavelength. When the band gap wavelength is kg $\lambda g [\mu m]$ and the band gap energy is Eg [eV], the relational expression $\lambda g = 1.24/Eg$ is approximately established.

Figure 2A:
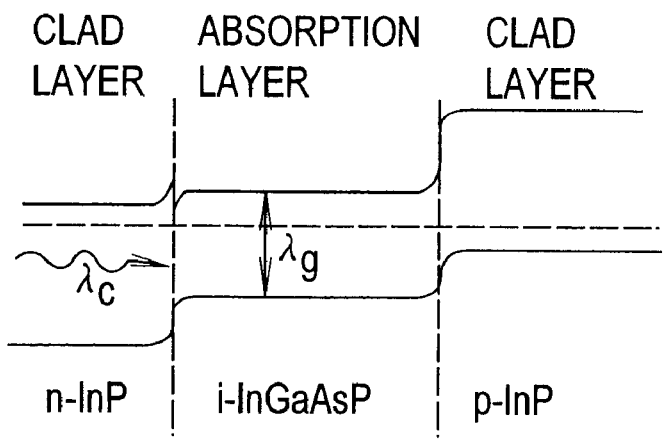
FIGS. 2A, 2B and FIG. 2C are conceptual diagrams depicting an operation of the optical short pulse generator in accordance with the first embodiment.

When the EA modulator 103 has a layered structure comprising a p-type InP clad layer, an undoped InGaAsP light absorption layer and an n-type InP clad layer, these layers have the potential structure shown in FIG. 2A in a state where an electric field is not applied, that is, in an equilibrium state. Under this state, light to be guided passes the EA modulator 103 without being absorbed if the wavelength $\lambda c$ of the incident light is longer than the band gap wavelength $\lambda g$ (that is, Ec<Eg).

Figure 2B:
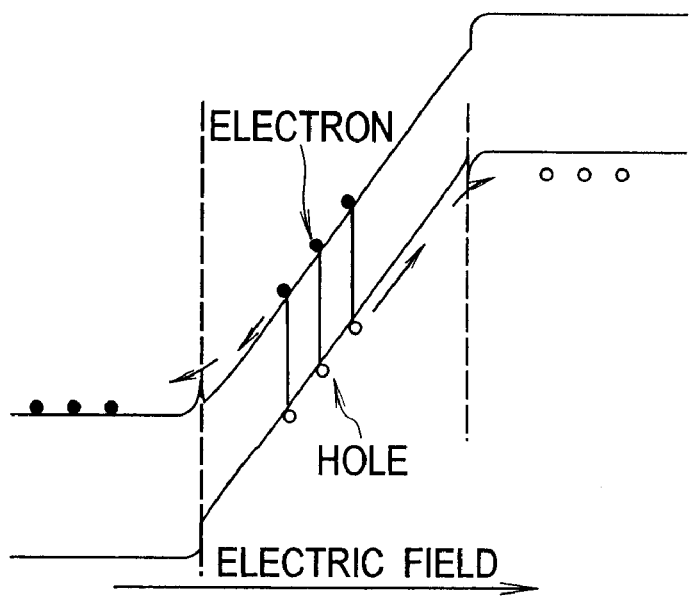

When a reverse bias electric field is applied, on the other hand, each layer of the EA modulator 103 has the potential structure shown in FIG. 2B. In other words, when an electric field is applied, the potential of the light absorption layer is distorted. The distortion of the light absorption layer decreases the band gap effectively, by which the absorption coefficient of the light absorption layer increases. When light is absorbed, electrons in the valence band are excited into the conduction band in the light absorption layer, therefore holes are generated in the valence band and electrons are generated in the conduction band. Since an electric field is being applied to the light absorption layer, holes move to the n-type InP clad layer and the electrons move to the p-type InP clad layer. In a non-saturated state, the photo-carriers, that is holes and electrons, generated in the light absorption layer, are quickly swept out to the clad layer by the function of the electric field, and do not accumulate in the light absorption layer. As a result, light continuously injected into the light absorption layer is continuously absorbed as is.

Figure 2C:
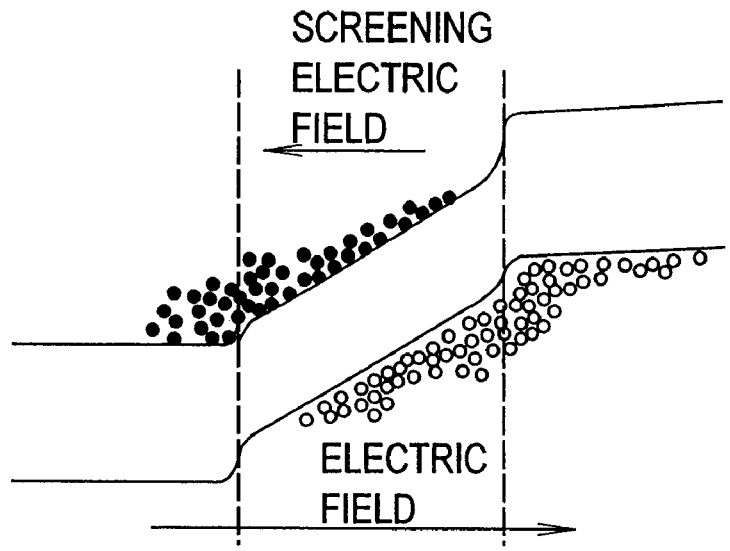

If photo-carriers accumulate in the light absorption layer without moving into the clad layer, the number of seats for carriers are filled in the valence band and conduction band, and light absorption saturates. FIG. 2C shows this state. When light absorption saturates, it is possible that the photo-carriers accumulate in the valence band and conduction band have spatial distribution. This spatial distribution generates a screening electric field in a direction which offsets the applied electric field. Because of this, the electric field applied to the light absorption layer substantially decreases and light absorption quantity decreases. The phenomena where light absorption saturates as photo-carriers accumulate is called a "pile up".

Figure 3:
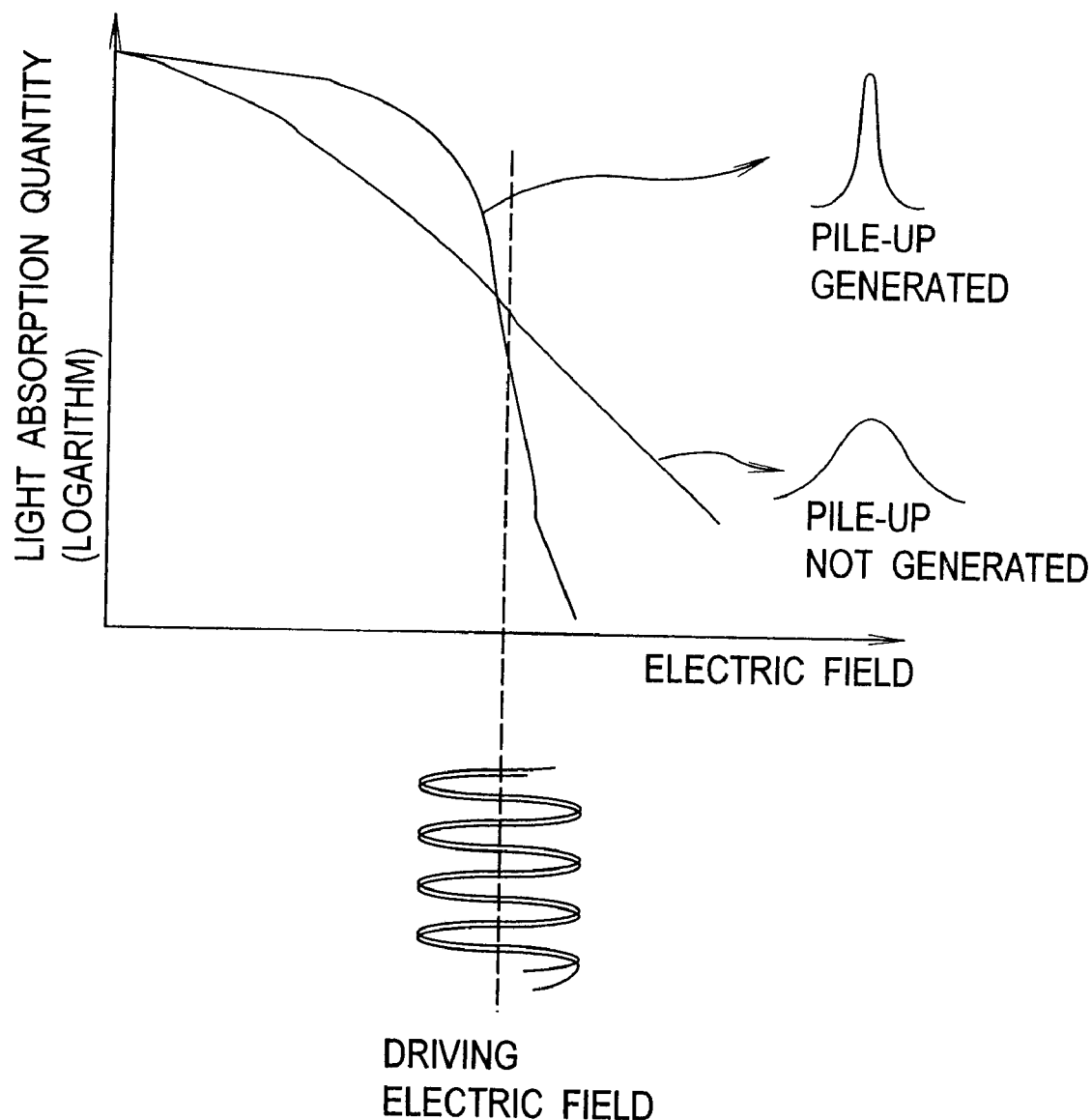
FIG. 3 is a graph depicting an operation of the optical short pulse generator in accordance with the first embodiment.
Figure 4:
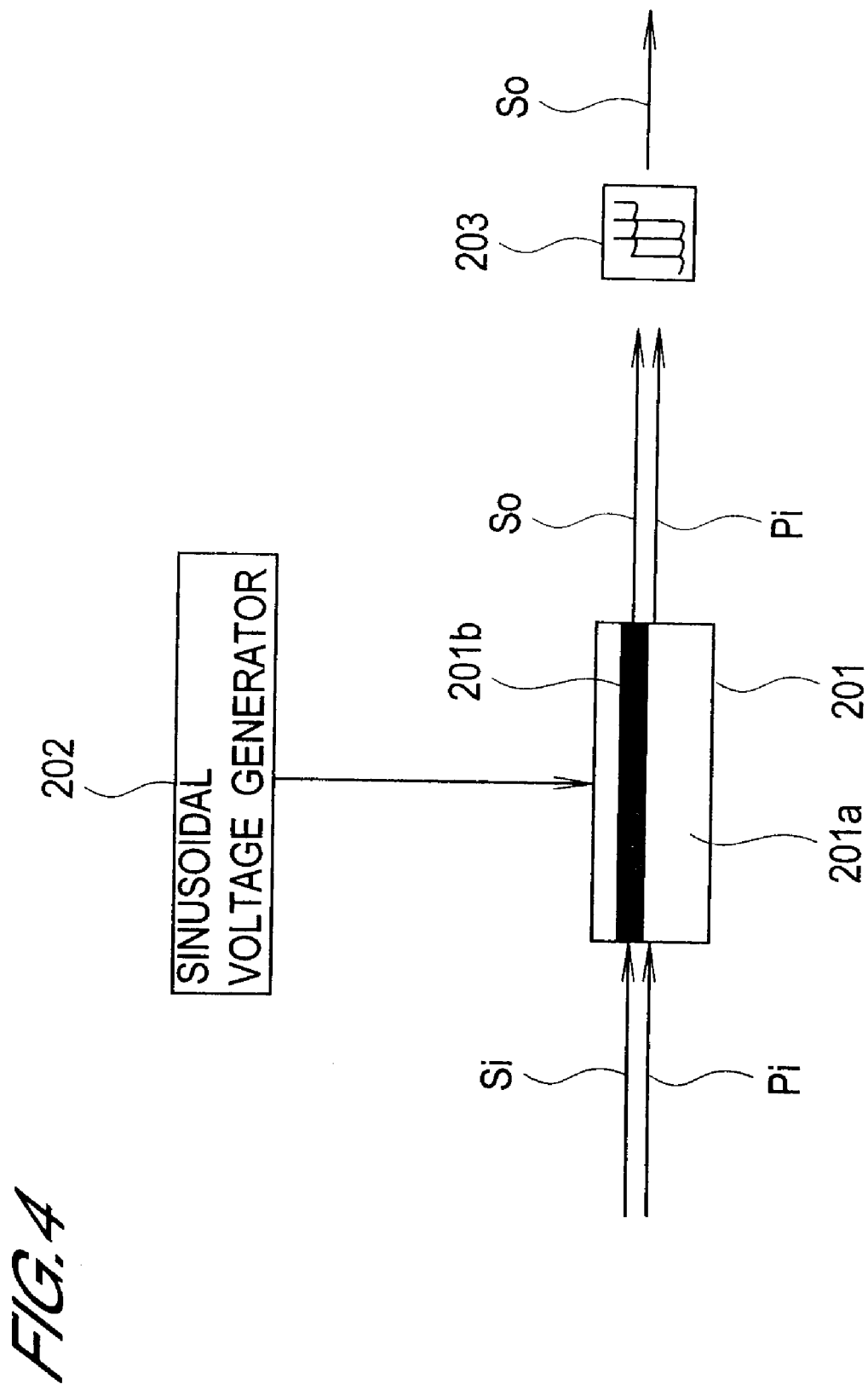
FIG. 4 is a conceptual diagram depicting a configuration of an optical short pulse generator in accordance with a second embodiment.

FIG. 3 is a graph depicting the relationship of the magnitude of the electric field applied to the light absorption layer and the quantity of the light absorbed by the light absorption layer. As FIG. 3 shows, the light absorption quantity when a pile up is generated depends considerably more on the change of the applied electric field than the light absorption quantity when a pile up is not generated. Therefore, as FIG. 3 shows, the change of light absorption quantity can be very high by generating a pile up. In other words, the extinction characteristics of the EA modulator is greatly improved by generating a pile up. By improving the extinction characteristics of the EA modulator, the loss of optical short pulse train can be decreased, and a minimum value of the pulse width which the EA modulator can generate can be decreased.

When a pile up is generated, the quantity of accumulated photo-carriers does not gradually decrease as the applied electric field increases, but rapidly decreases after the applied electric field reaches a certain value. This is the main reason why light absorption efficiency is increased by the generation of a pile up. In this phenomena, various factors interact in a very complicated way. One reason why this phenomena is generated is because photo-carriers are swept out as the applied electric field increases, which decrease the screening electric field. When the screening electric field decreases as the applied electric field increases, a substantial applied electric field increases with acceleration, and as a result, the sweep out of photo-carriers also increases with acceleration. In addition, when the EA modulator has a double hetero-junction, a barrier, that is a potential difference, exists at the junction between the clad layer which has a large band gap and the absorption layer which has a small band gap. The magnitude of the effect of this barrier interrupting the sweep-out of photo-carriers depends not only on the quantity of doped impurities, but also on the applied electric field. This is another reason why a rapid sweep-out of photo-carriers occurs.

In order to generate a pile up in the EA modulator, photo-carriers should accumulate in the light absorption layer, as mentioned above. Whether photo-carriers accumulate or not depends on the speed of a sweep-out of the photo-carriers to the clad layer and on the number of photo-carriers to be generated. When the electric field to be applied to the light absorption layer is decreased, the speed of a sweep-out of photo-carriers to the clad layer decreases, so photo-carriers accumulate. When the applied electric field is small, the ratio between the quantity of photo-carriers to be generated and the quantity of photo-carriers to be swept out to the clad layer depends on the magnitude of the applied electric field. So, if the magnitude of the applied electric field is the same, the absolute number of photo-carriers remaining in the light absorption layer is higher when the number of generated photo-carriers is high compared to when the number of generated photo-carriers is low. Therefore, the accumulation of photo-carriers occurs more easily as the number of generated photo-carriers is higher. The speed of a sweep-out of photo-carriers depends on the type of semiconductor material constituting the EA modulator and on the impurity density. Factors which determine this speed, however, are complicated, so it is not easy to freely set the speed. The number of generated photo-carriers, on the other hand, can easily be controlled by the difference between the band gap wavelength and the incident light wavelength (that is detuning quantity) and the intensity of the incident light.

A pile up of the EA modulator 103 can be generated by increasing the intensity of the continuous wave light Si. However, if a pile up is generated by increasing the intensity of the continuous wave light Si, the intensity of the continuous wave light Si must be adjusted according to the set value of the pulse width of the optical short pulse train So. This adjustment makes it difficult to optimize the setting of the optical short pulse generator. Therefore, it is preferable to generate a pile up using light which is different from the continuous wave light Si. In the optical short pulse generator in accordance with the present embodiment, a pile up is generated by the pump light Pi, so the pulse width of the optical short pulse train So can be adjusted while manipulating the intensity of the continuous wave light Si to a constant value. In the case of the optical short pulse generator of the present embodiment, the intensity Pp of the pump light Pi can be adjusted according to the setting of the pulse width of the optical short pulse train So.

To increase the absorption coefficient, the wavelength $\lambda p$ of the pump light Pi is preferably a value near the band gap wavelength $\lambda g$. If the wavelength $\lambda p$ of the pump light Pi is too close to the band gap wavelength, however, the absorption efficiency for the continuous wave light Si becomes extremely poor due to the sudden increase in the absorption coefficient. Also, if the wavelength $\lambda p$ of the pump light Pi is shorter than the band gap wavelength $\lambda g$, an accumulation of photo-carriers may be generated even when reverse bias is not applied to the light absorption layer 103b, which may interrupt improvement of the extinction characteristics. For these reasons, it is preferable that the wavelength $\lambda p$ of the pump light Pi is a wavelength which is near the band gap wavelength of the EA modulator 103, and is also longer than this band gap wavelength.

Second Embodiment

The second embodiment of the present invention will now be described with reference to FIG. 2.

As FIG. 2 shows, the optical short pulse generator in accordance with the present invention comprises an EA modulator 201, a sinusoidal voltage generator 202 and a light band pass filter 203.

The EA modulator 201 has an InGaAsP light absorption layer 201b formed on an InP substrate 201a. The EA modulator 201 injects the continuous wave light Si from a laser which is not illustrated, and injects pump light Pi from a pump light generator which is also not illustrated. In this embodiment, the continuous wave light Si and the pump light Pi are injected to a same face of the EA modulator 201. The EA modulator 201 emits an optical short pulse train So from the other face. A part of the pump light Pi injected into the EA modulator 201 is absorbed by the light absorption layer 201b of the EA modulator 201, and the rest is emitted from the other face. In the following description, $\lambda s$ is the wavelength of the light Si, and $\lambda p$ is the wavelength of the pump light Pi.

The sinusoidal voltage generator 202 generates a sinusoidal voltage with a predetermined frequency, and applies the voltage to the EA modulator 201. The pulse width of the optical short pulse train So is determined by the frequency of this sinusoidal voltage.

The light bandpass filter 203 passes light with wavelength $\lambda s$ but blocks light with wavelength $\lambda p$. In other words, the light bandpass filter 203 passes only the optical short pulse train So but does not pass the pump light Pi.

The optical short pulse generator in accordance with the present invention implements excellent extinction characteristics by generating a pile up in the absorption layer 201b based on the same principle as the optical short pulse generator of the first embodiment.

As mentioned above, the continuous wave light Si and pump light Pi are injected to a same face of the EA modulator 201 of the present embodiment. So, if the light absorption layer 201 is an InP semiconductor, it is preferable to set the difference between the wavelength $\lambda s$ of the light Si and the wavelength $\lambda p$ of the light Pi to a sufficiently large value. If the difference between the wavelength $\lambda s$ of the light Si and the wavelength $\lambda p$ of the light Pi is small, the non-linear refractive index becomes large when the light intensity is large (optical Kerr effect), and a non-linear interaction more easily occurs between the lights Si and Pi. Non-linear interaction includes cross-phase modulation (XPM) and four wave mixing (FWM).

Also, for the same reason as the first embodiment, it is preferable that the wavelength of the light Si is near or the same as the band gap wavelength $\lambda g$, and the wavelength $\lambda p$ of the $\lambda s$ light Pi is longer than the band gap wavelength.

What is claimed is:

1. An optical short pulse generator comprising:
    means for generating optical short pulses from incident light injected into a light absorption layer according to the frequency of the control voltage;
    means for supplying said incident light to said light absorption layer of said generation means;
    means for applying said control voltage to said generation means; and
    means for supplying pump light to said light absorption layer of said generation means in order to generate a pile up.

2. The optical short pulse generator according to claim 1, wherein said incident light and said pump light are different lights.

3. The optical short pulse generator according to claim 2, wherein said incident light is injected from one end face of said light absorption layer and said pump light is injected from the other end face, that is, an end face facing said one end face.

4. The optical short pulse generator according to claim 3, further comprising a first circulator which guides said incident light emitted from said incident light supply means to said one end face, and refracts said pump light emitted from said one end face without being absorbed by said light absorption layer so that it does not reach said incident light supply means.

5. The optical short pulse generator according to claim 3, further comprising a second circulator which outputs said optical short pulses emitted from said other end of said generation means to outside of the equipment, and guides said pump light emitted from said pump light supply means to said other end of said generation means.

6. The optical short pulse generator according to claim 3, wherein the wavelength of said incident light is near or the same as the band gap wavelength of said light absorption layer.

7. The optical short pulse generator according to claim 3, wherein the wavelength of said pump light is near the band gap wavelength of said light absorption layer.

8. The optical short pulse generator according to claim 3, wherein the wavelength of said pump light is longer than the band gap wavelength of said light absorption layer.

9. The optical short pulse generator according to claim 2, wherein said incident light and said pump light are injected from the same end face of said light absorption layer.

10. The optical short pulse generator according to claim 9, further comprising a light filter which transmits and outputs to outside the equipment said optical short pulses emitted from said generation means, and does not transmit said pump light emitted from said generation means without being absorbed by said light absorption layer.

11. The optical short pulse generator according to claim 9, wherein the wavelength of said incident light is near or the same as the band gap wavelength of said light absorption layer.

12. The optical short pulse generator according to claim 9, wherein the wavelength of said pump light is selected so that non-linear interaction is not generated between said incident light and said pump light.

13. The optical short pulse generator according to claim 9, wherein the wavelength of said pump light is longer than the band gap wavelength of said light absorption layer.

14. The optical short pulse generator according to claim 1, wherein said generation means is an electro-absorption semiconductor optical modulator.

15. The optical short pulse generator according to claim 14, wherein said light absorption layer is an InGaAsP layer.

16. The optical short pulse generator according to claim 14, wherein said generation means has a p-type InP clad layer and an n-type InP clad layer.

17. The optical short pulse generator according to claim 1, wherein said incident light supply means is a laser.

18. The optical short pulse generator according to claim 1, wherein said incident light is a continuous wave light.

19. The optical short pulse generator according to claim 1, wherein said control voltage is sinusoidal voltage.

20. The optical short pulse generator according to claim 1, wherein said incident light and said pump light are the same light.

* * * * *